UNITED STATES PATENT OFFICE.

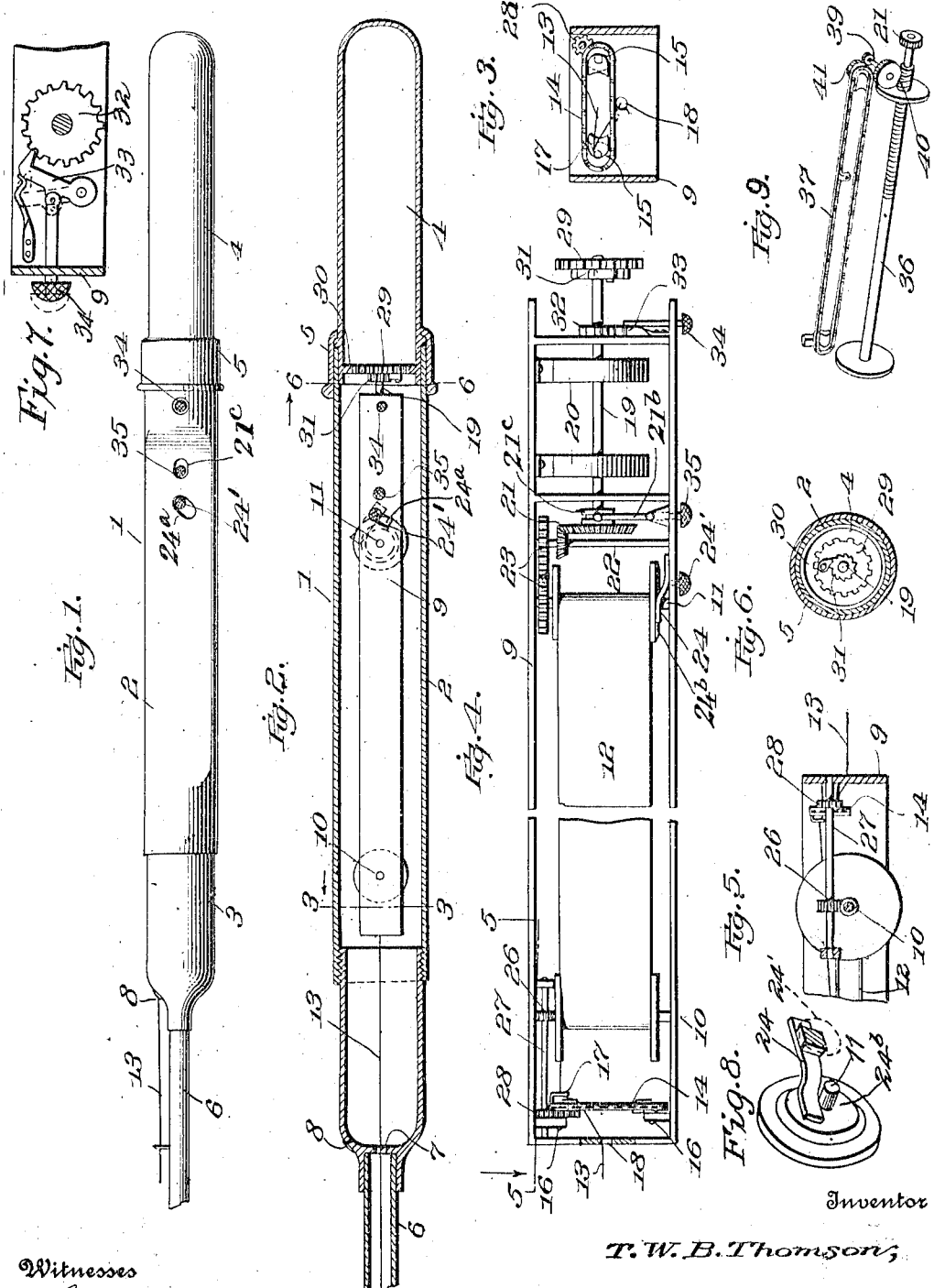

THOMAS W. B. THOMSON, OF EDSON, ALBERTA, CANADA.

COMBINED FISHING-ROD HANDLE AND REEL.

1,119,474.  Specification of Letters Patent.  Patented Dec. 1, 1914.

Application filed June 3, 1913. Serial No. 771,549.

*To all whom it may concern:*

Be it known that I, THOMAS W. B. THOMSON, a citizen of Canada, residing at Edson, in the Province of Alberta and Dominion of Canada, have invented new and useful Improvements in Combined Fishing-Rod Handles and Reels, of which the following is a specification.

This invention relates to a combined fishing rod handle and reel, one object of the invention being to provide a construction wherein the reel is inclosed within a hollow handle, in conjunction with a spring motor for actuating the reel to wind up the line, which motor may be rewound for operation as required by manipulation of a portion of the handle.

A further object of the invention is to provide a handle and reel construction which admits of the passage of the line either through or on the exterior of the rod, and which embodies means for guiding the line to adapt it to wind evenly on and off the reel.

A still further object of the invention is to provide a handle and reel which permits to the ready removal of the reel mechanism whenever required, to enable the line to be easily dried, or replaced with a new line.

The invention consists of the novel features of construction, combination and arrangement of parts hereinafter fully described and claimed, reference being had to the accompanying drawings, in which:—

Figure 1 is an elevational view of a fishing rod handle embodying my invention, showing also a portion of the rod. Fig. 2 is a longitudinal section through the rod handle on an enlarged scale. Fig. 3 is a detail transverse section on line 3—3 of Fig. 2. Fig. 4 is a view of the reel mechanism removed from the handle. Figs. 5 and 6 are detail sections on lines 5—5 and 6—6 of Fig. 4. Fig. 7 is a detail section on line 7—7 of Fig. 4. Fig. 8 is a detail view illustrating the construction of the friction brake device. Fig. 9 is a detail view disclosing a modification.

In carrying my invention into practice, I provide a rod handle 1, comprising a body or central section 2, a tip section 3, and a butt section 4. These sections are detachably connected, the tip section 3 being threaded or otherwise removably connected with the central section 2, while the butt section 4 is revolubly mounted in a cap or sleeve 5, threaded or otherwise removably connected with the section 2. The tip section 3 is fitted to the rod 6 in any desired manner, and may be provided with a guide opening 7 in line with its axis for the passage of the line through a tubular rod, and with a guide opening 8 at one side of its longitudinal center for the passage of the line when extending externally along the rod through the usual guides thereon.

The central handle section 2 is angular in form except at its ends to receive a frame 9, which is held from revolution therein, and is adapted to be slidably inserted and removed. This frame 9 supports the reel mechanism, which is herein shown in the form of a pair of transverse shafts 10 and 11 having end spools, around which shafts passes an endless belt or carrier 12, to which one end of the line 13 is attached. This belt is movable in one direction to take or reel up the line, and in the opposite direction to let out the line.

At the forward end of the frame 9 is arranged a line guiding device comprising an endless belt or chain 14 passing over sprocket wheels 15 on shafts 16, one of the lengths of the said guide chain being provided with a guide loop or eye 17 through which the line extends. The guide chain 14 has a direction of movement in a direction transversely of the frame and belt 12, and operates in timed accord with the belt, so as to feed the line across the belt, so as to adapt the line to be regularly and evenly wound or unwound. The guide chain or line feeder is so arranged as to receive the line without binding, the line extending therefrom through an opening 18 in the forward end of the casing, and thence through the opening 7 or opening 8 according to the extension of the line through or on the exterior of the rod.

Arranged at the rear end of the casing is a spring motor comprising a longitudinally extending shaft 19, and a coiled spring 20, the terminals of which spring are respectively fixed to the frame and shaft, so that when the shaft is turned in one direction the spring will be primed or wound up for unwinding or reaction to rotate the shaft in the opposite direction. The forward end of the shaft 19 is connected by intermeshing gears 21 with a transverse, transmission shaft 22, which is connected at one end by gears 23 with the shaft 11, whereby the endless reel belt is driven.

Carried by the frame 9 is a spring metal friction brake shoe 24, connected by a stem with an external thumb button or finger piece 24". The said stem is movable in obliquely disposed guide slots 24$^a$ in the frame and body 2, whereby the free end of the brake shoe 24 may be adjusted into and out of engagement with the outer face of a friction brake disk 24$^b$ carried by the shaft 11, so that whenever desired the brake shoe may be moved into engagement with the brake disk to check or stop the outward movement of the line in casting or in playing a fish. One end of the shaft 10 is connected by intermeshing gears 26 with a transmission shaft 27 connected in turn by intermeshing gears 28 with the adjacent shaft 16, whereby, in the operation of the reel, the endless belt or feeder 14 is driven.

The rear end of the motor shaft 19 carries a gear 29 meshing with an internal gear 30 on the butt section 4 of the handle, said gear 29 having a pawl and ratchet or clutch connection 31 with the shaft 19, which permits of the motor spring to be wound up when the said handle section 4 is revolved in one direction, and the motor shaft to revolve independently of said handle section on the unwinding motion of the spring for the purpose of actuating the reel in winding direction. On the shaft 19 is also a ratchet wheel 32 adapted to be engaged by a spring actuated check pawl 33 pivotally mounted upon a transverse cross piece of the frame 9, for movements into and out of engagement with said ratchet wheel, whereby the motor may be normally held from action and released for operation whenever required. A button or finger piece 34 is provided with a stem, as shown in Fig. 7, which is pivotally connected with the pawl, so that by drawing the finger piece outward the pawl may be disengaged from the ratchet wheel, while by pressing the finger-piece inward the pawl may be forced into engagement with the ratchet wheel and retained in such position by the spring. The stem is movable in guide openings in the body 2 and frame 9 and has sufficient frictional engagement therewith to hold the pawl retracted against the pressure of the spring when the finger piece is drawn outward. When the finger piece is forced inward, the pressure exerted thereon, acting in conjunction with the spring, maintains the pawl in working engagement with the ratchet wheel. One of the gear members 21 is feathered or splined to its shaft and is slidably mounted on the casing and to the stem of which pawl is pivoted so that the reel gearing may be disconnected from the motor gearing whenever it is desired to allow the line to freely unwind or to be cast.

It will be seen from the foregoing description that the invention provides a handle for fishing rods in which a self winding reel mechanism is completely inclosed and housed from injury and the access of dirt, dust, etc., and in which the motor of the winding mechanism is adapted to be primed or rewound whenever required by simply manipulating a portion of the handle. It will also be seen that the construction described provides for an even and regulated winding and unwinding of the line on and off the reel, and the removal of the reel mechanism in a convenient manner to allow the line to be thoroughly dried.

In Fig. 7 of the drawing I have shown a modified form of construction in which the reel comprises a longitudinally extending shaft 36 driven directly from the motor shaft by the gears 21, said shaft being provided with end spools or flanges, one of which is provided with a friction brake surface for coöperation with the flange brake shoe, as before described. The endless chain or feeder 37 in this construction is arranged within an off set on one side of the handle section 2, and is driven from the reel shaft section 2, and is driven from the reel shaft through a transmission shaft 39, said transmission shaft being connected with the reel shaft by intermeshing gears 40 and with the adjacent feeder chain shaft by intermeshing gears 41. The operation with this construction will be readily understood.

Having thus described my invention I claim:—

1. A combined fishing rod handle and reel mechanism comprising a handle having a movable portion, a reel inclosed within the handle, a line feeder arranged for coöperation with the reel, a spring motor in gear with the reel and feeder, and means operable by the movable section of the handle for rewinding the motor.

2. A combined fishing rod handle and reel mechanism comprising a handle having a movable portion, a frame removably mounted in the handle, a reel carried by said frame, a line feeder carried by the frame for coöperation with the reel, a spring motor for actuating the reel and feeder, gearing between the motor and movable portion of the handle whereby the spring may be rewound, and means to disengage said gearing to permit independent unwinding motion of the motor.

3. A combined handle and reel mechanism for reels comprising a sectional handle, one of the sections of the handle being rotatably mounted, a reel removably inclosed within the handle, a feeder for coöperation with the reel, a spring actuated motor for operating the reel and feeder, clutch gearing between the motor and rotatable portion of the handle whereby the motor may be rewound and is adapted to unwind independently, means for normally holding the motor inactive and releasing it for action, and means for disconnecting the reel and feeder from the motor.

In testimony whereof I affix my signature in presence of two witnesses.

THOMAS W. B. THOMSON.

Witnesses:
 E. S. HOTCHKISS,
 E. M. HUGILL.